United States Patent
Morton

[15] 3,703,152
[45] Nov. 21, 1972

[54] DISTRESS SIGNALING DEVICE

[72] Inventor: Paul S. Morton, 82 Mandalay Drive, Oshtemo, Mich. 49001

[22] Filed: Feb. 7, 1972

[21] Appl. No.: 224,033

[52] U.S. Cl. .............116/28 R, 40/125 N, 40/129 C, 116/63 P
[51] Int. Cl. ...............................................E01f 9/10
[58] Field of Search .......116/28, 63, 63 P; 40/125 N, 40/129 C; 94/1.5

[56] References Cited

UNITED STATES PATENTS

| | | |
|---|---|---|
| 3,024,552 | 3/1962 | MacLea....................40/129 C |
| 3,593,681 | 7/1971 | Sermovitz.................116/63 P |
| 3,625,177 | 12/1971 | Miller.......................116/63 P |

FOREIGN PATENTS OR APPLICATIONS

| | | |
|---|---|---|
| 1,112,672 | 5/1968 | Great Britain............116/63 P |
| 1,167,085 | 10/1969 | Great Britain............116/63 P |
| 1,242,732 | 8/1959 | France......................116/63 P |
| 1,802,834 | 6/1970 | Germany..................116/63 P |
| 1,815,253 | 6/1970 | Germany..................116/63 P |
| 681,763 | 1/1965 | Italy.........................116/63 P |

*Primary Examiner*—Louis J. Capozi
*Attorney*—Woodhams, Blanchard and Flynn

[57] ABSTRACT

A vehicle distress signaling device. The signaling device has an elongated housing adapted to store a triangularly shaped and foldable distress signaling device therein. A hook is provided on the housing adjacent one end and is adapted to couple the housing to the upper margin of a vertically adjustable window panel on the exterior of a side of the vehicle. A coupling device is provided for coupling triangularly shaped signaling device to an end of the housing remote from the hook when the signaling device is unfolded to the triangular shape to thereby display the signaling device on the exterior side of the vehicle.

9 Claims, 10 Drawing Figures

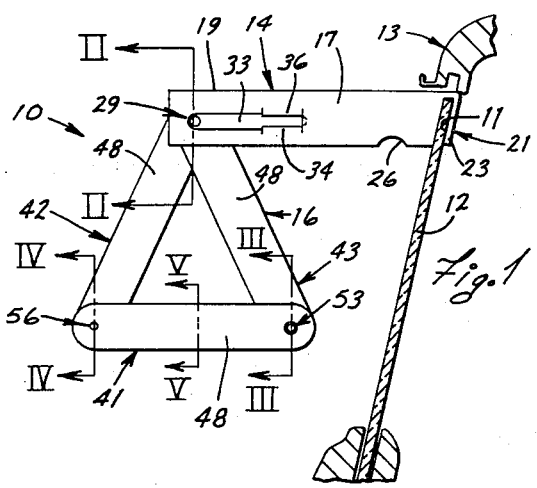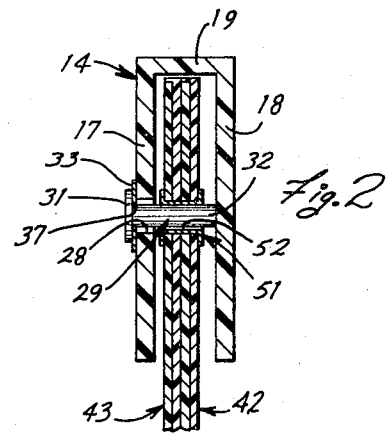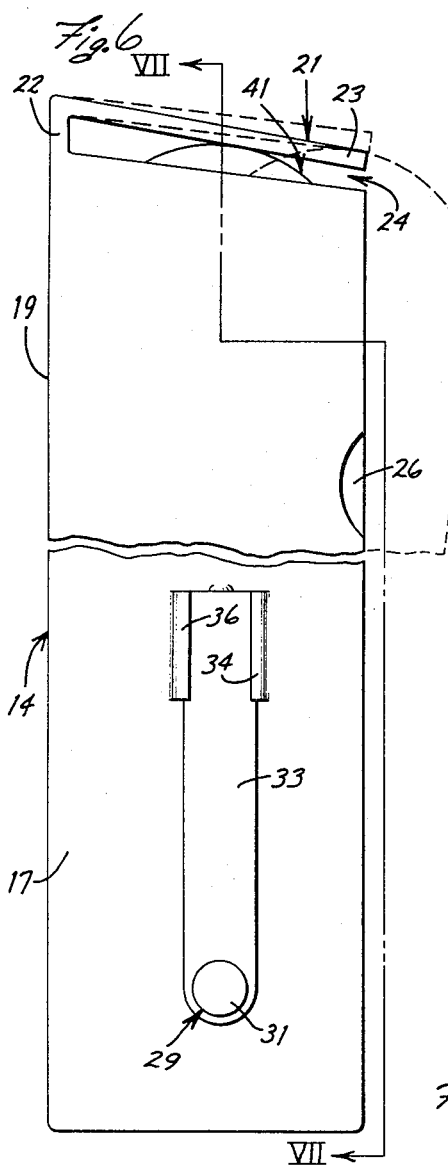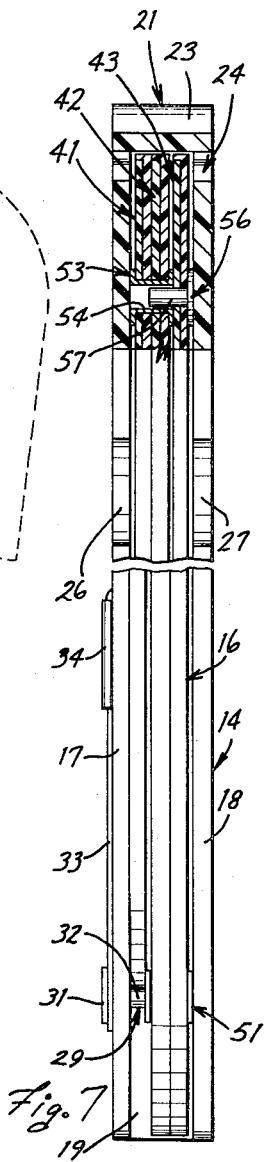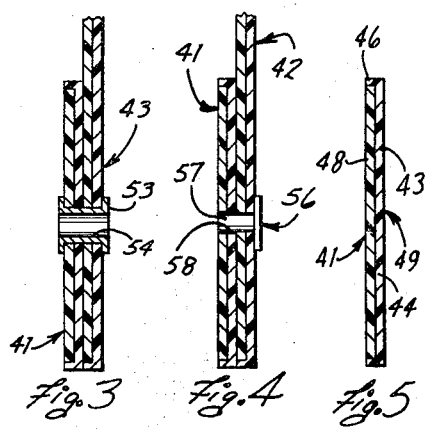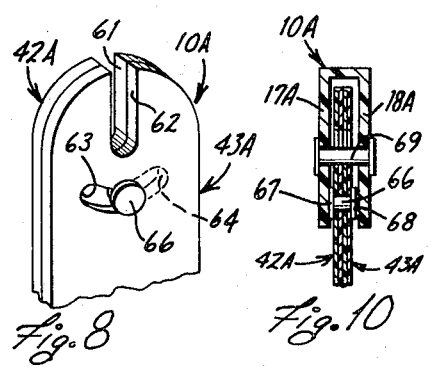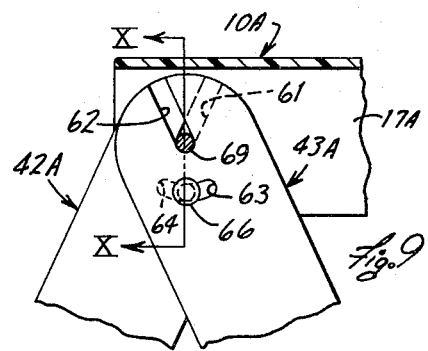

DISTRESS SIGNALING DEVICE

FIELD OF THE INVENTION

This invention relates to a vehicle distress signaling device and, more particularly, relates to a signaling device having the capability of convenient storage in anticipation of use within an expedient of operational operative association with conventional automotive vehicles to mark and signal a vehicle in distress to thereby warn oncoming motorists.

BACKGROUND OF THE INVENTION

Travel on the interstate highway system in the United States and the autobahn systems in Europe occurs at a very high rate of speed and it is necessary that the driver of vehicles on these systems be on the alert for unexpected occurrences in the roadway ahead. One type of unexpected occurrence is noting a vehicle along the shoulder of the highway. It is not always possible for the driver of the oncoming vehicle to clearly discern whether the vehicle on the shoulder of the highway is moving, attempting to attain access onto the highway or whether the vehicle is stopped and is in some state of distress, such as being out of fuel, having a flat tire and the like. Thus, the driver of the oncoming vehicle will make an effort to move to the side of the highway remote from the vehicle so as to minimize the risk of some unforeseeable event occurring as the oncoming vehicle approaches the slow-moving or stalled vehicle alongside the highway. During heavy traffic conditions, it is not always convenient for the driver of the oncoming vehicle to move to the side of the highway remote from the slow-moving or stalled vehicle and, in an effort to minimize the risk of accident, the driver of the oncoming vehicle will slow down while passing the slow-moving or stalled vehicle. When the driver slows down, this creates an increasing risk of accident to those following particularly because the next oncoming drivers will have to watch both the slower moving vehicle on the highway as well as the slow-moving or stalled vehicle on the shoulder of the road.

Accordingly, a vehicle distress signaling device which will signal oncoming drivers as to the status of the automobile along the shoulder of the road, well in advance of the final approach to the distressed vehicle is highly desirable for the purpose of minimizing the risk of accident. Further, a vehicle distress signaling device which is capable of being stored in a readily convenient container which may be placed in the glove compartment of the automobile and also having the capability of being removed from the container and hung from the window panel of the automobile without having to get out of the car is also highly desirable. Accordingly, the objects of the invention are:

1. To provide a vehicle distress signaling device which is adapted to be foldably received in a housing having a size to be easily stored in the glove compartment of a vehicle.

2. To provide a vehicle distress signaling device, as aforesaid, wherein the housing for the signaling device serves as a support for the signaling device when supported from a window panel of an automobile.

3. To provide a vehicle distress signaling device which can be easily displayed without requiring that the driver of the distressed vehicle get out of the car.

4. To provide a vehicle distress signaling device, as aforesaid, which is composed of easily manufacturable and easily assembled components.

5. To provide a vehicle distress signaling device which is convenient to use with a minimum of instructions.

6. To provide a vehicle distress signaling device, as aforesaid, for use in both daytime and nighttime situations, said distress signaling device being capable of reflecting light from the headlights of oncoming vehicles during nighttime situations and for emitting a light when exposed to daylight during daytime situations.

Other objects and purposes of this invention will become apparent to skilled persons upon a reading of the following specification and an inspection of the accompanying drawing, in which:

FIG. 1 is a side elevational view of the vehicle distress signaling device;

FIG. 2 is a sectional view taken along the line II—II in FIG. 1;

FIG. 3 is a sectional view taken along the line III—III in FIG. 1;

FIG. 4 is a sectional view taken along the line IV—IV of FIG. 1;

FIG. 5 is a sectional view taken along the line V—V of FIG. 1;

FIG. 6 is a side elevational view of the vehicle distress signaling device with the foldable triangular-shaped distress signaling device being collapsed in the stored position;

FIG. 7 is a fragmentary sectional view taken along the line VII—VII of FIG. 6;

FIG. 8 is a fragmentary perspective view of a modified foldable triangular-shaped distress signalling device;

FIG. 9 is a fragmentary side elevational view of the modified vehicle distress signalling device; and FIG. 10 is a sectional view taken along the line X—X of FIG. 9.

Certain terminology will be used in the following descriptive material for convenience in reference only and will not be limiting. The words "up," "down," "right" and "left" will designate directions in the drawing to which reference is made. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a vehicle distress signaling device which has an elongated housing having a pair of parallel sidewalls interconnected by a bottom wall to define a U shape. Hook means are provided on the housing adjacent one end thereof and adapted to couple the housing to the upper edge of a vertically adjustable window panel on the exterior of a side of the vehicle. A polygon-shaped, foldable distress signaling means is provided and are adapted to be foldably received between the pair of parallel sidewalls on the housing for storage therein. Coupling means are provided for coupling the signaling means adjacent the end of a housing remote from the hook, when unfolded to the polygon shape, to thereby display the signaling means on the exterior side of the vehicle.

DETAILED DESCRIPTION

A vehicle distress signaling apparatus 10 is illustrated in FIG. 1 attached to the upper margin 11 of a window panel 12 on a vehicle 13. The signaling apparatus 10 comprises a housing 14 and a triangular-shaped, foldable distress signaling device 16.

The housing 14 comprises a pair of parallel sidewalls 17 and 18 (FIG. 2) interconnected by a web or bottom wall 19 to define a U shape. The housing 14 may be made of any convenient material, such as plastic so as to minimize damage thereto when subjected to normal abuse, as well as preventing a scratching or marring of surfaces with which the signaling device 10 may come into contact.

A hook 21 is integrally formed on the housing 14 and comprises generally an L-shaped configuration having a leg 22 integrally connected to the web 19 of the housing 14 and a leg 23 which extends inclined to the vertical when the web 19 is positioned horizontally as illustrated in FIG. 1.

An elongated slot 24 defined by one end of the housing 14 and the leg 23 of the hook 21 is inclined to the vertical to accommodate a window panel 12 which is inclined to the vertical as illustrated in FIG. 1. Thus, the housing 14 will extend generally horizontally away from the inclined window panel 12. The leg 23 is also flexible and is movable between the solid and broken line positions illustrated in FIG. 6.

A pair of notches 26 and 27 are provided in the sidewalls 17 and 18, respectively, on the sidewalls 17 and 18 along edges thereof remote from the web 19 and adjacent the hook 21. The notches 26 and 27 may be of any convenient configuration, such as semi-circular in shape as illustrated in FIGS. 1 and 6.

An opening 28 (FIG. 2) is provided in the sidewall 17 of the housing 14 and is located approximately midway between the web 19 and the free edge of the sidewall 17. A pin 29 having a stem portion 32 is adapted to be received in the opening 28. The length of the stem portion 32 extends from the head portion 31 located on the exterior side of the sidewall 17 to a position of engagement with the interior surface of the sidewall 18. A flexible band 33 is secured to the sidewall 17 by clips 34 and 36 which grip the opposite longitudinal edges of the flexible band 33 to prevent the pin 29 from falling out of the opening 28. An opening 37 is provided in the end of the flexible and resilient band 33 remote from the clips 34 and 36 and the stem 32 of the pin 29 is adapted to be received in the opening 37 so that the underside of the head 31 may be secured to the exterior surface of the band 33. The flexible band 33 will, therefore, maintain the stem 32 in the position illustrated in FIG. 2 but the stem portion 32 may be removed from the opening 28 by pulling outwardly on the band 33 adjacent the end remote from the clips 34 and 36.

The signaling apparatus 16 is polygonally, here triangularly, shaped and has in this embodiment a base section 41 and two side sections 42 and 43. Each of the base section 41 and the two side sections 42 and 43 have a cross section identical to that illustrated in FIG. 5.

More particularly, the sections of the triangle comprise an elongated base portion 44 having a pair of upright edge walls 46 and 47 along the opposite lateral edges of the base portion 44. An elongated reflectorized strip 48 is mounted on the base portion between the upright edge walls 46 and 47 and is secured by any convenient means, such as any convenient adhesive. The surface 49 of the base portion 44 is preferably coated with a fluorescent material which will emit light upon exposure to external radiation such as occur during daylight. The reflectorized strip 48, on the other hand, is adapted to reflect light from a particular localized source, such as the headlights of an oncoming vehicle.

The two side sections 42 and 43 are pivotally connected by a rivet 51 (FIG. 2) having an opening 52 therethrough and adapted to receive the stem 32 of the pin 29. The base section 41 is pivotally connected to the side section 43 by a hollow rivet 53 (FIG. 3) having an opening 54 therethrough. The rivets 51 and 53 permit a relative pivotal movement between each of the respective base section 41 and sidewall sections 42 and 43. The base section 41 and the side section 43 are releasably connected by a peg 56 fixably secured to the side section 42 (FIG. 4) and the stem portion 57 is adapted to be received in an opening 58 in the base section 41.

The base section 41 and the two side sections 42 and 43 may be collapsed as illustrated in FIG. 7 so that the three sections are completely housed within the housing 14. The length of the base section 41 is less than the distance between the pivot axis defined by the rivet 51 and the pivot axis defined by the rivet 53. Thus, the stem portion 32 (FIG. 7) of the pin 29 may be received in the opening 52 through the rivet 51 to hold the two side sections 42 and 43 of the signaling apparatus to one end of the housing 14. The opposite ends of the side sections 42 and 43 as well as the end of the base section 41 which is secured to the rivet 53 are held in the housing by the resiliency of the leg 23 of the hook 21 and are, therefore, held against inadvertently pivoting out of the housing 14 about the axis of the rivet 51. The stem portion 57 (FIG. 7) of the peg 56 is received in the opening 54 of the rivet 53 when the sections of the triangular-shaped signaling device 16 are folded into the housing 14 for storage therein.

OPERATION

Although the operation of the signaling apparatus 10 will be apparent to skilled persons, a summary thereof will be given for convenience.

When it is desired to use the vehicle distress signaling apparatus 10, the thumb and forefinger, for example, may be placed into the notches 26 and 27 to grasp therebetween and move the ends of the side sections 42 and 43 remote from the rivet 51 as well as the corresponding end of the base section 41 about the axis defined by the stem portion 32 of the pin 29 in the direction of the broken line representation illustrated in FIG. 6. The stem portion 57 of the peg 56 may then be removed from the opening 54 through the rivet 53 so that the side sections 42 and 43 can be separated to define an angle therebetween as illustrated in FIG. 1. The base section 41 may be pivoted about the axis of the rivet 53 to a generally horizontal position as illustrated in FIG. 1 and the stem portion 57 of the peg 56 may be received in the opening 58 of the base section 51 as illustrated in FIG. 4.

The operator may then roll the window panel 12 down to permit placement of the hook 21 over the upper margin 11 of the window panel 12. The window panel 12 may then be moved upwardly to prevent a removal of the unit from the window panel. Thus, the signalling device 16 will be displayed in a position suspended from the housing 14. If the weather outside the vehicle is wet and rainy, the signaling apparatus may be displayed without causing the elements to come inside the vehicle.

During use of the signaling apparatus 10 at night, the reflectorized surfaces 48 on each of the base section 41 and two side sections 42 and 43 should be positioned to face the rear of the vehicle so that the headlights of the oncoming vehicles will be reflected by the reflectorized strips 48 to warn the oncoming motorist that the vehicle is in distress. During daylight hours, however, the signaling device 16 may be detached from the housing 14 by removing the pin 29, as aforesaid, from the opening 52 in the rivet 51 and the signaling device may be reversed so that the fluorescent surfaces 49 on each of the base section 41 and two side sections 42 and 43 will face the rear of the vehicle 13. The signaling device 16 may then be placed back into the housing 14 between the walls 17 and 18 so that the stem 32 of the pin 29 may again be received in the opening 52 of the rivet 51 to support the signal device 16.

MODIFIED CONSTRUCTION

FIGS. 8 to 10 illustrate a modified embodiment of a vehicle distress signalling apparatus 10A. The modified signalling apparatus 10A will be referred to by the same reference numerals designating the corresponding components of the signalling apparatus 10 but with the suffix A added thereto.

Referring first to FIG. 8, the sections 42A and 43A of the triangular-shaped signalling device 16A are each identical and have an elongated slot 61 and 62, respectively, in mutually adjacent ends thereof. The slots 61 and 62 are aligned when the sections 42A and 43A are parallel. A pair of partially aligned arcuate slots 63 and 64 are provided in each of the sections 42A and 43A spaced from the innermost end of the elongated slots 61 and 62. The center point of the radius for the arcuate slots 63 and 64 is the innermost end of the elongated slots 61 and 62. A rivet 66 is received in the aligned portion of the arcuate slots 63 and 64. The rivet 66 has enlarged heads 67 and 68 on opposite ends which overlap the remote sides of the sections 42A and 43A to prevent the rivet 66 from being removed from the arcuate slots 63 and 64 but still permit a sliding movement of the rivet in the slots 63 and 64 relative to sections 42A and 43A.

A rivet 69 (FIGS. 9 and 10) is provided on the housing 14A and is fixed to and extends between the parallel sidewalls 17A and 18A. The central portion of the rivet 69 is received in the aligned slots 61 and 62 so that when the sections 42A and 43A are moved to a nonparallel position about the axis of the rivet 66, the sections 42A and 43A will be secured to the housing 14A as illustrated in FIG. 9 by means of the nonaligned slots 61 and 62. The triangular-shaped form 16A may be removed from the housing 14A by aligning the sections 42A and 43A into parallel alignment so that the slots 61 and 62 become aligned to permit the removal of the sections 42A and 43A from the rivet 66. This procedure also facilitates an easy reversal of the sides of the triangular-shaped form 16A so that the side having the fluorescent material or the reflectorized strip is facing in the desired direction to warn oncoming traffic.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vehicle distress signaling device, comprising:
   elongated housing means having a pair of parallel sidewalls interconnected by a bottom wall to define a U shape;
   fastening means on said housing means adjacent one end thereof and adapted to fasten said housing means to the upper margin of a vertically adjustable window panel on the exterior of a side of said vehicle;
   polygonally shaped and foldable distress signaling means adapted to be foldably received between said pair of parallel sidewalls on said housing means for storage therein; and
   coupling means for coupling said signaling means, when unfolded to said polygonal shape, adjacent an end of said housing means remote from said fastening means to display said signaling means on said exterior side of said vehicle.

2. A vehicle distress signaling device, comprising:
   elongated housing means having a pair of parallel sidewalls interconnected by a bottom wall;
   hook means on said housing means adjacent one end thereof and adapted to fasten said housing means to the upper margin of a vertically adjustable window panel on the exterior of a side of said vehicle;
   polygonally shaped and foldable distress signaling means having at least a base section and two side sections and adapted to be foldably received between said pair of parallel sidewalls on said housing means;
   first pivot means on said housing means adjacent the opposite end of said housing means from said hook means for pivotally securing the mutually adjacent ends of said two side sections to said housing means;
   second pivot means on the end of one of said side sections remote from said first pivot means for pivotally securing said base section to said one side section; and
   fastener means on the end of said base means remote from said second pivot means and on the end of said other side section remote from said first pivot means for fastening said base sections to said other side section.

3. A vehicle distress signaling device according to claim 2, wherein said hook means is an integral part of said housing means.

4. A vehicle distress signaling device according to claim 2, wherein at least selected ones of said sections of said foldable polygon comprise an elongated strip having a base portion and a pair of upright edge wall means extending along the opposite lateral edges of said strip and an elongated reflectorized strip mounted on said base portion between said upright edge wall means, the side of said base portion opposite said reflectorized strip having a fluorescent type finish thereon.

5. A vehicle distress signaling device according to claim 4, wherein said first pivot means comprises means defining an opening through one of said pair of sidewalls of said housing means and an opening coaxial therewith through said mutually adjacent ends of said side sections and removable fastening means received in said coaxial openings to permit a reversal of the exposed one of said reflectorized and said fluorescent surfaces to the rear of said vehicle.

6. A vehicle distress signaling device according to claim 5, wherein said removable fastening means comprises flexible and resilient band means secured at one end to an exterior surface of said one of said pair of sidewalls of said housing means and pin means secured to the opposite end of said band means, said pin means being received in said coaxial openings and adapted to be moved out of said coaxial openings upon a flexing of said band means to releasably secure said polygonally shaped and foldable distress signaling means to said housing means.

7. A vehicle distress signaling device according to claim 2, wherein said distress signaling means is suspended from an end of said housing means remote from said hook means when said distress signaling means is unfolded to said polygon shape.

8. A vehicle distress signaling device according to claim 2, wherein said first pivot means comprises an elongated shaft means secured to and extending between said parallel sidewalls and alignable slot means in mutually adjacent ends of said side sections, said slot means, when aligned, receiving said shaft means to thereby secure said signaling means to said housing means.

9. A vehicle distress signaling device according to claim 8, including slidable pivot means for pivotally securing said mutually adjacent ends of said side sections.

* * * * *